Patented Feb. 12, 1935

1,990,681

UNITED STATES PATENT OFFICE 1,990,681

SELENOCARBOCYANINE AND PROCESS OF PREPARING IT

Frank L. White, Rochester, N. Y., assignor to Eastman Kodak Company, Rochester, N. Y., a corporation of New York No Drawing. Application August 27, 1931,
Serial No. 559,777

20 Claims. (Cl. 260—44)

This invention relates to a new chemical compound and more particularly to a new class of dyes useful for sensitizing photographic emulsions and to methods for preparing those dyes.

As ordinary photographic emulsions are generally indifferent to those colors of the spectrum of longer wave length, various types of sensitizing dyes have been suggested for incorporation in photographic emulsions or for employing over emulsions as overcoatings, so as to increase the spectral sensitiveness thereof. The new dyes described herein depart from the class of most of those previously suggested in that they contain selenium in the nuclei which are condensed to form the dye.

An object of the present invention is to provide a process for the preparation of dyes of the selenocarbocyanine series containing benzoselenazole nuclei and having substituents attached to the central carbon atom of the three-carbon chain. A further object of this invention is to provide such dyes as may be added to photographic emulsions, such as gelatino-silver-halide emulsions, or coated thereon as an overcoating whereby the spectral sensitivity of the photographic emulsion is increased. Other objects will hereinafter appear.

I have found that dyes having excellent photographic sensitizing properties may be prepared by the treatment of a 1-methyl-benzoselenazole alkyl quaternary salt with an ortho-ester of a carboxylic acid, the acid corresponding to which contains more than one carbon atom in the molecule. The reaction may be advantageously carried out in boiling dry pyridine. The ortho-esters of the carboxylic acids which I have found particularly suitable include as ortho-esters of the aliphatic carboxylic acids, such ortho-esters as, trimethyl or triethyl orthoacetate, propionate, caproate, valerate and the like; as ortho-esters of the substituted aliphatic carboxylic acids, such esters as trimethyl or triethyl ortho-gamma-phenoxybutyrate and trimethyl or triethyl ortho-phenylacetate; and as ortho-esters of aromatic carboxylic acids such esters as trimethyl or triethyl orthobenzoate and trimethyl or triethyl ortho-p-toluate. Ortho-esters of substituted aromatic carboxylic acids may also be employed, such for example as where the aryl group (phenyl) is substituted by an alkyl group (methyl) or the like. The trimethyl and triethyl ortho-esters are illustrative and are not to be understood as limiting my invention to their use only. Instead of using trimethyl or triethyl orthoacetate I may use methyldiethyl or dimethylethyl orthoacetate; instead of trimethyl or triethyl orthopropionate one may employ dimethylethyl or ethyl-di-n-propyl orthopropionate and instead of using trimethyl or triethyl ortho-n-caproate I may use methyldiethyl ortho-n-caproate. In other words the alkoxy groups of the ortho-ester may be dissimilar, if desired.

The 1-methylbenzoselenazole has the following structural formula:

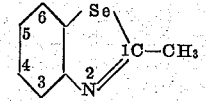

When this is acted upon by a compound having a suitable acid radical, such as dimethyl sulphate, there is produced the 1-methylbenzoselenazole alkyl quaternary salt having the following structural formula:

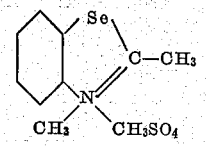

It will thus be noted that I employ a benzoselenazole which has a reactive methyl group in the 1-position.

When two molecular proportions of this 1-methylbenzoselenazole alkyl quaternary salt are condensed in the presence of dry pyridine, for instance, with one molecular proportion of an ortho-ester of a carboxylic acid, such as those described above, for instance, triethylorthoacetate, there occurs the following probable reaction:

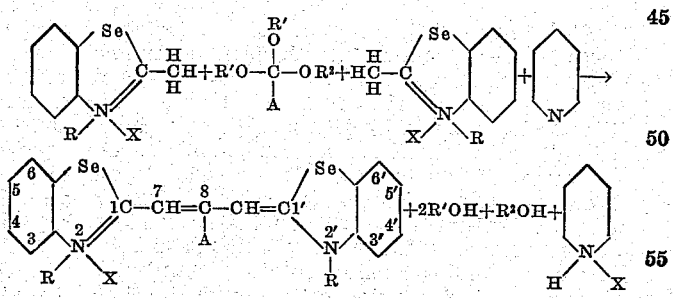

resulting in the formation of the dye shown. This dye may be converted into a salt, other than the salt of formation, by treating it in solution, with an aqueous solution of a salt containing a suitable acid radical such, for instance, as potassium iodide.

In the above structural formula R, R' and R² represent alkyl groups such, for instance, as methyl or ethyl and X a suitable acid radical. The character A stands for the substituent group to be introduced into the three carbon chain connecting the nuclei. This three carbon chain consists of three methenyl groups linked together as a trimethenyl chain having the structural formula:

$$-CH=CH-CH=$$

This chain links together the benzoselenazole nuclei. The substituted group A replaces the hydrogen of the central carbon atom of this trimethenyl chain.

In practice, I have found that it is most desirable to carry out the foregoing condensation by the use of a 1-methylbenzoselenazole dialkylsulphate, such for instance as 1-methylbenzoselenazole methomethylsulphate. The dye so produced is conveniently isolated by double decomposition with ammonium or potassium iodide, or the like, in aqueous solution by which the iodine atom replaces the acid radical represented by X.

The nomenclature and numbering of the above groups of compounds and intermediates are in accord with present usage and follow the system of numbering normally employed in connection with the known thiocarbocyanines. The numbering, of course is arbitrary and is given for the guidance of those skilled in the art in order that there be no question as to the identify of the compounds covered by my invention.

The preparation of the 1-methylbenzoselenazole (used in the preparation of the dyes described herein) is given in the literature. It consists in general of the reaction of an excess of acetyl chloride or the zinc salt of ortho ortho'-diaminodiphenyldiselenide in some solvent such as dry benzene, first in the cold and later while heated. By adding water and then an excess of ammonium hydroxide the 1-methylbenzoselenazole goes into the benzene layer, from which it is recovered and purified.

The ortho-esters of the carboxylic acids which I employ have been described in the literature, or in previous patent applications, such for instance as the applications Serial Nos. 505,982, 505,983 and 505,984 of L. G. S. Brooker filed December 31, 1930. The preparation of the 1-methylbenzoselenazole alkyl quaternary salt and of the dye is fully indicated in the following examples which are typical of the manner in which my invention may be carried out.

*Example I*

2,2'-8-trimethylselenocarbocyanine iodide.—Three grams (2 mol.) of 1-methylbenzoselenazole were heated on a steam bath for several hours with 1.9 grams (2 mol.) of methylsulphate. Addition took place rapidly with the formation of 1-methylbenzoselenazole methomethylsulphate. To this crude solid quaternary salt was added 15 cc. of dry pyridine and 3 cc. (in excess of 1 mol.) of triethyl orthoacetate which reaction mixture was heated under reflux with agitation until boiling occurred and the boiling continued gently for a few minutes, for instance 10 minutes. While still hot this reaction mixture was treated with 10 grams of potassium iodide in 20 cc. of water. Minute bluish crystals separated at once. Further separation occurred by standing aside to cool. The iodide of the dye, so produced, was filtered off and washed. The dye was purified by crystallization from methyl alcohol and was finally obtained as a dull purplish blue crystalline mass which gave a purplish-pink solution in methyl alcohol.

*Example II*

2,2'-dimethyl-8-ethylselenocarbocyanine iodide.—Three grams (2 mol.) of 1-methylbenzoselenazole were heated with 1.9 grams (2 mol.) of methylsulphate on a steam bath for several hours. Addition occurred rapidly with the formation of 1-methylbenzoselenazole methomethylsulphate. To the crude solid quaternary salt thus produced was then added 15 cc. of dry pyridine together with 3 cc. (in excess of 1 mol.) of trimethyl orthopropionate, the reaction mass being then heated over a free flame under reflux with agitation until boiling occurred, the boiling being continued for a few minutes, for instance 15 minutes. While still hot there was added to this reaction mixture a solution of 10 grams of potassium iodide in 20 cc. of water. The reaction mixture was then stood aside until separation of the crude dye occurred, which was then filtered off and washed. The crude dye was purified by boiling in acetone and filtering hot, leaving crude dark green crystals upon the filter. These crystals of the dye were further purified by crystallization from methyl alcohol and were finally obtained as dark green crystals, which gave a purple solution in methyl alcohol.

As indicated in the earlier portion of this specification, I may, instead of employing triethyl-orthoacetate or trimethyl orthopropionate, employ any of the ortho-esters of carboxylic acids set forth above or ones similar thereto. By so doing it will be apparent that I obtain at will a dye in which there is substituted in the 8-position of the trimethenyl chain, either an alkyl group, a substituted alkyl group or an aryl or substituted aryl group. Thus, the letter A in the above structural formula indicates any of these groupings. As before indicated, various alkyl groups may be employed in the portion indicated by the letter R to obtain different dyes of varying properties. While I have obtained the best yields by employing the 1-methylbenzoselenazole methomethylsulphate in my condensations, 1-methylbenzoselenazole alkyl quaternary salts including many other suitable acid radicals may be employed in my condensation; in fact I may employ an alkyl quaternary salt having any salt forming acid radical that will not render the dye formed therefrom too sparingly soluble or deleteriously affect the photographic sensitizing properties of the dye such, for example, as a halide, para-toluenesulphonate, nitrate, acetate, perchlorate or the like, although I have been unable to obtain as good yields, when employing such acid radicals in the alkyl quaternary salts as where I have employed the 1-methylbenzoselenazole methomethylsulphate as the alkyl quaternary salt. Thus, the character X in the above formulæ indicates any suitable acid radical such as a halide, p-toluenesulfonate, alkylosulphate, nitrate, acetate, perchlorate or the like.

While the principal use now known for these new chemical compounds is for sensitizing photographic emulsions it may well be that other uses therefore will be discovered from time to time and consequently it is not intended that the foregoing description of the sensitizing properties of these dyes shall in any way limit the scope of the claims appended hereto.

What I claim is:

1. A carbocyanine dye of the following structure:

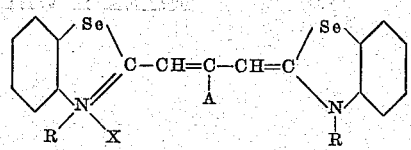

in which R equals alkyl, X equals an acid radical and A equals an aryl group of the benzene series or an alkyl group, which alkyl group may be substituted by an aryl or an aryloxy group of the benzene series.

2. A carbocyanine dye of the following structure

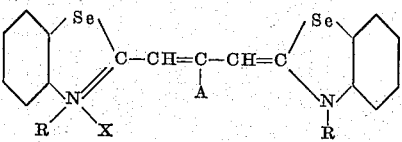

in which R=alkyl, X=acid radical and A= an alkyl group.

3. A carbocyanine dye of the following structure

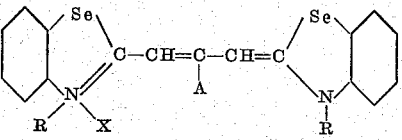

in which R=alkyl, X=acid radical and A=an aryl group of the benzene series.

4. A 2,2'-dialkyl-8 alkyl-selenocarbocyanine salt.

5. A 2,2'-dialkyl-8-methyl-selenocarbocyanine salt.

6. A 2,2'-8-trimethyl selenocarbocyanine salt.

7. A 2,2'-dialkyl - 8 - ethyl-selenocarbocyanine salt.

8. A 2,2'-dimethyl-8-ethyl selenocarbocyanine salt.

9. A 2,2'-8-triethyl selenocarbocyanine salt.

10. A 2,2'-dialkyl-8-alkyl - selenocarbocyanine halide.

11. The process of preparing a selenocarbocyanine salt which comprises condensing two molecular proportions of a 1-methylbenzoselenazole alkyl quaternary salt with one molecular proportion of an ortho-ester of an aliphatic monohasic carboxylic acid, which may be substituted by an aryl or an aryloxy group of the benzene series, or an ortho-ester of an aromatic monobasic carboxylic acid of the benzene series, the carboxylic acid corresponding to which esters contains more than one carbon atom in the molecule, under the influence of heat and in the presence of an organic base which is a solvent for the reactants and which acts to bind the elements of acid eliminated from the quaternary salt as a result of the condensation.

12. The process of preparing a selenocarbocyanine salt which comprises condensing two molecular proportions of a 1-methylbenzoselenazole alkyl quaternary salt with one molecuar proportion of an ortho-ester of an aliphatic monobasic carboxylic acid, the carboxylic acid corresponding to which contains more than one carbon atom in the molecule, under the influence of heat and in the presence of an organic base which is a solvent for the reactants and which acts to bind acid eliminated from the quaternary salt as a result of the condensation.

13. The process of preparing a selenocarbocyanine salt which comprises condensing two molecular proportions of a 1-methylbenzoselenazole alkyl quaternary salt with one molecular proportion of an ortho-ester of an aromatic monobasic carboxylic acid of the benzene series, under the influence of heat and in the presence of an organic base which is a solvent for the reactants and which acts to bind acid eliminated from the quaternary salt as a result of the condensation.

14. The process of preparing a selenocarbocyanine salt which comprises condensing a 1-methylbenzoselenazole alkyl quaternary salt with a trialkyl ortho-ester of an aliphatic monobasic carboxylic acid, which may be substituted by an aryl or an aryloxy group of the benzene series or an ortho-ester of an aromatic monobasic carboxylic acid of the benzene series, the carboxylic acid corresponding to which ester contains more than one carbon atom in the molecule, under the influence of heat and in the presence of an organic base which is a solvent for the reactants and which acts to bind acid eliminated from the quaternary salt as a result of the condensation.

15. The process of preparing a selenocarbocyanine salt which comprises condensing a 1-methylbenzoselenazole alkyl quaternary salt with a trialkyl ortho-ester of a monobasic aliphatic carboxylic acid, the carboxylic acid corresponding to which contains more than one carbon atom in the molecule, under the influence of heat and in the presence of an organic base which is a solvent for the reactants and which acts to bind acid eliminated from the quaternary salt as a result of the condensation.

16. The process of preparing a selenocarbocyanine salt which comprises condensing a 1-methylbenzoselenazole alkyl quaternary salt with a trialkyl ortho-ester of a monobasic aromatic carboxylic acid of the benzene series, under the influence of heat and in the presence of an organic base which is a solvent for the reactants and which acts to bind acid eliminated from the quaternary salt as a result of the condensation.

17. The process of preparing a selenocarbocyanine salt which comprises condensing a 1-methylbenzoselenazole alkyl quaternary salt with triethyl ortho acetate, under the influence of heat and in the presence of an organic base which is a solvent for the reactants and which acts to bind acid eliminated from the quaternary salt as a result of the condensation.

18. The process of preparing a selenocarbocyanine salt which comprises condensing a 1-methylbenzoselenazole alkyl quaternary salt with trimethyl ortho propionate, under the influence of heat and in the presence of an organic base which is a solvent for the reactants and which acts to bind acid eliminated from the quaternary salt as a result of the condensation.

19. The process of preparing a selenocarbocyanine salt which comprises condensing 1-methylbenzoselenazole methomethylsulphate with a trialkyl ortho-ester of a monobasic aliphatic carboxylic acid, the carboxylic acid corresponding to which contains more than one carbon atom in the molecule, under the influence of heat and in the presence of an organic base which is a solvent for the reactants and which acts to bind acid eliminated from the quaternary salt as a result of the condensation.

20. The process of preparing a selenocarbocyanine salt which comprises condensing a 1-methylbenzoselenazole alkyl quaternary salt with triethyl ortho propionate, under the influence of heat and in the presence of an organic base which is a solvent for the reactants and which acts to bind acid eliminated from the quaternary salt as a result of the condensation.

FRANK L. WHITE.